US010755087B2

(12) United States Patent
Rajvanshi et al.

(10) Patent No.: US 10,755,087 B2
(45) Date of Patent: Aug. 25, 2020

(54) AUTOMATED IMAGE CAPTURE BASED ON EMOTION DETECTION

(71) Applicant: ADOBE INC., San Jose, CA (US)

(72) Inventors: Tushar Rajvanshi, Uttar Pradesh (IN); Sourabh Gupta, Uttar Pradesh (IN); Ajay Bedi, Himachal Pradesh (IN)

(73) Assignee: ADOBE INC., San Jose, CA (US)

( * ) Notice: Subject to any disclaimer, the term of this patent is extended or adjusted under 35 U.S.C. 154(b) by 140 days.

(21) Appl. No.: 16/170,724

(22) Filed: Oct. 25, 2018

(65) Prior Publication Data

US 2020/0134296 A1 Apr. 30, 2020

(51) Int. Cl.
*G06K 9/00* (2006.01)
*G06F 3/0482* (2013.01)
*G06K 9/62* (2006.01)

(52) U.S. Cl.
CPC ....... *G06K 9/00315* (2013.01); *G06F 3/0482* (2013.01); *G06K 9/00362* (2013.01); *G06K 9/6262* (2013.01)

(58) Field of Classification Search
CPC ........... G06K 9/00315; G06K 9/00362; G06K 9/6262; G06F 3/0482
USPC ........ 382/118, 173, 159, 305, 180, 195, 219
See application file for complete search history.

(56) References Cited

U.S. PATENT DOCUMENTS

| 10,182,333 | B2 * | 1/2019 | Vasic | G08B 25/001 |
|---|---|---|---|---|
| 2017/0319123 | A1 * | 11/2017 | Voss | G16H 40/63 |
| 2017/0330029 | A1 * | 11/2017 | Turcot | A61B 5/1176 |
| 2017/0337438 | A1 * | 11/2017 | el Kaliouby, Jr. | A61B 5/1103 |
| 2018/0035938 | A1 * | 2/2018 | el Kaliouby | G16H 40/63 |
| 2018/0330152 | A1 * | 11/2018 | Mittelstaedt | G06K 9/00261 |
| 2019/0034706 | A1 * | 1/2019 | el Kaliouby | G06T 7/73 |
| 2019/0122071 | A1 * | 4/2019 | Jin | G06K 9/00268 |
| 2019/0228215 | A1 * | 7/2019 | Najafirad | G06K 9/00302 |
| 2019/0332247 | A1 * | 10/2019 | Liu | G06F 3/0482 |
| 2019/0347478 | A1 * | 11/2019 | Sorci | G06K 9/00671 |
| 2020/0082002 | A1 * | 3/2020 | Whitman | G06F 16/5866 |
| 2020/0134295 | A1 * | 4/2020 | el Kaliouby | G06K 9/00228 |

* cited by examiner

*Primary Examiner* — Marceau Milord
(74) *Attorney, Agent, or Firm* — Shook, Hardy & Bacon, L.L.P.

(57) ABSTRACT

Methods and systems are provided for performing automated capture of images based on emotion detection. In embodiments, a selection of an emotion class from among a set of emotion classes presented, via a graphical user interface, is received. The emotion class can indicate an emotion exhibited by a subject desired to be captured in an image. A set of images corresponding with a video is analyzed to identify at least one image in which a subject exhibits the emotion associated with the selected emotion class. The set of images can be analyzed using at least one neural network that classifies images in association with emotion exhibited in the images. Thereafter, the image can be presented in association with the selected emotion class.

14 Claims, 8 Drawing Sheets

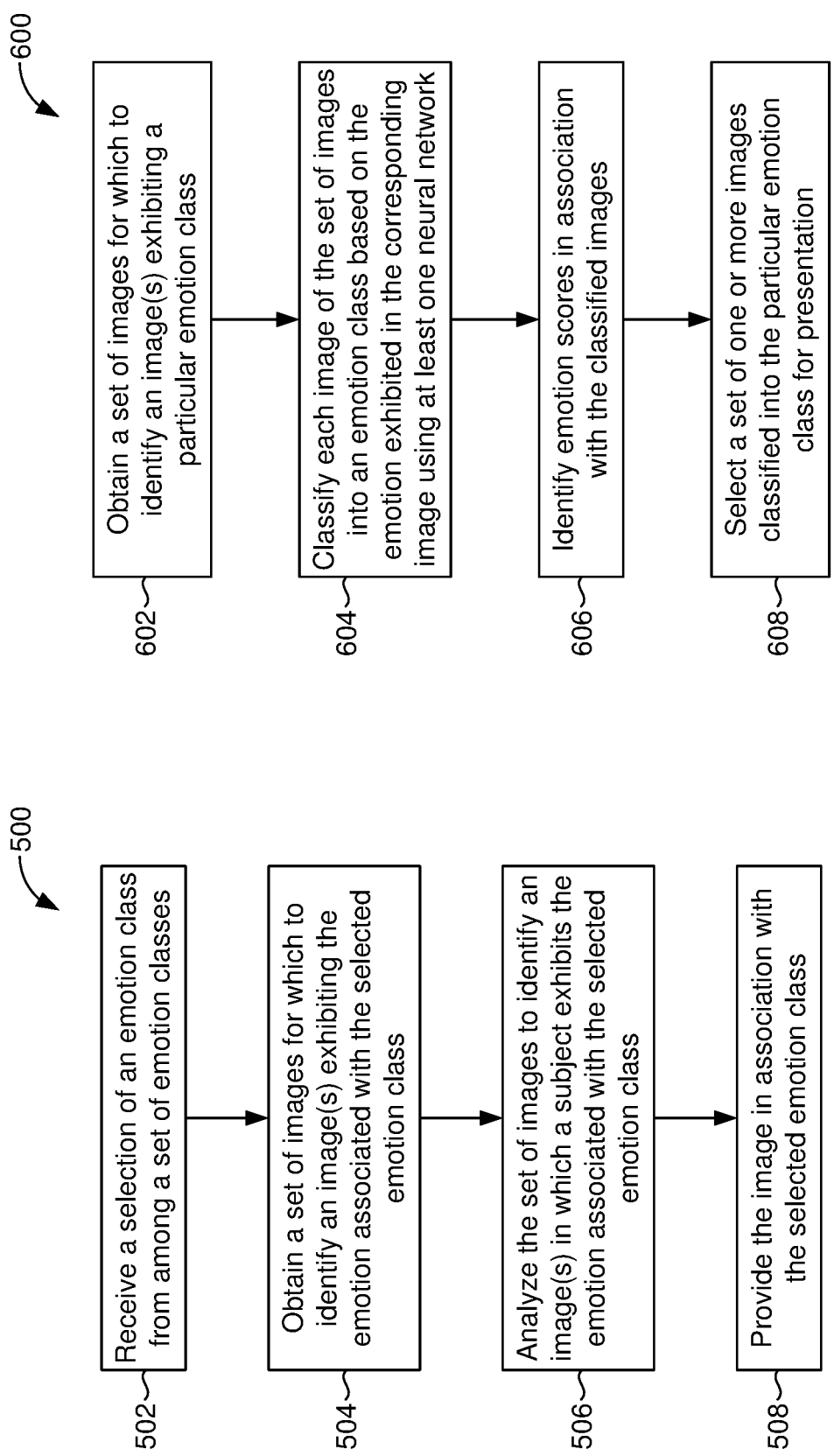

AUTOMATED IMAGE CAPTURE BASED ON EMOTION DETECTION

BACKGROUND

Oftentimes, users desire to capture images of individuals expressing emotion, such as joy, sadness, excitement, or the like. For example, a photographer photographing a wedding may wish to capture happiness in the bride and groom. Capturing such desired emotion, however, can be difficult. In particular, it may be challenging for a photographer to be in the right place at the right time and, further, capture the image at the right time with appropriate focus. As such, in an effort to capture such desired candid moments, multiple photographers and corresponding photography equipment may be organized. Even with experience and planning, candid moments may still go uncaptured. Some conventional systems have been developed to automate image capture in accordance with an individual's smile. However, even with capturing smiles, many emotions expressed by individuals may not be captured. As such, conventional approaches oftentimes do not result in a desired candidate emotion being exhibited by an individual in an image.

SUMMARY

Embodiments of the present invention are directed to facilitating automated image captured based on emotion detection. In this regard, an emotion(s) desired to be captured in an image can be automatically captured based on the emotion expressed in the images. In some cases, a user may select an emotion(s) desired, and based on the user selection, images (e.g., frames of a video) can be analyzed to identify and capture images in which a subject is exhibiting such desired emotion(s). In operation, to identify images having a particular emotion, a neural network system can be trained and utilized to classify images as exhibiting a particular emotion. In some embodiments, and advantageously, the neural network system can include at least one neural network that classifies images based on facial expressions and body expressions within the images. Based on the emotion classifications and corresponding emotion scores (e.g., probability or confidence scores), a particular set of images can be selected for presentation to the user. For example, images classified in accordance with the desired emotion and attaining a certain emotion score may be selected and provided for presentation.

BRIEF DESCRIPTION OF THE DRAWINGS

FIG. 5 illustrates an example method for automated image capturing based on emotion detection, in accordance with embodiments of the present invention;

FIG. 6 illustrates another example method for automated image capturing based on emotion detection, in accordance with embodiments of the present invention;

DETAILED DESCRIPTION

Figure 1A:
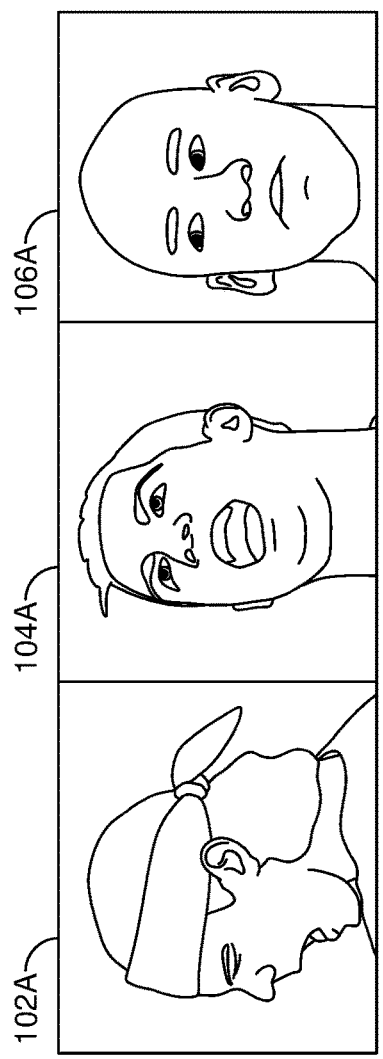
FIG. 1A depicts example images expressing emotion via facial expressions.

Oftentimes, candid moments are desired to be captured in images. In particular, candid moments enable a photographer to capture a natural emotion that might be otherwise difficult to obtain in a controlled photo session. However, obtaining a natural emotion in a candid image can be difficult as an individual(s) is not posed, positioned, or otherwise placed within a controlled environment. For example, in some cases, multiple candid moments for multiple subjects or individuals may be desired (e.g., at a wedding or birthday party). As another example, multiple locations for capturing images may be needed to capture candid moments (e.g. a sporting event in which individuals are moving and changing positions and/or directions). To adequately capture candid moments in these instances, multiple photographers and corresponding sets of equipment may be needed to be prepared for various candid moments. Further, to adequately capture a desired candid moment, camera focus and operation at the right moment may be needed (e.g., to capture an emotion of excitement), which can be difficult to obtain, particularly given unpredictability and motion of individuals for which candid moments are desired. As such, this manual image capturing process can be tedious, inefficient, and ineffective (e.g., when candid moments are not captures).

Some conventional systems have been developed to capture images of smiling individuals. Such systems, however, are limited to capturing an image when a smile is detected. Although beneficial to capture images of smiling individuals, other emotions of individuals are oftentimes desired. For instance, a user or photographer may desire to capture images of individuals displaying emotions of sadness, happiness, anger, surprise, excitement, or the like. Further, an individual smiling does not necessarily convey a happiness emotion, and vice versa, an individual may exhibit a happy emotion without smiling.

As such, embodiments of the present disclosure are directed to facilitating automated image capture based on emotion detection. In this regard, various emotions exhibited by an individual(s) can be automatically captured. An emotion generally refers to instinctive or intuitive feeling, such as but not limited to sadness, happiness, anger, surprise, suspense, fear, tiredness, excitement, or the like. Generally, as described herein, the emotion(s) to capture in an image(s) can be selected by a user such that the user can view a set of images in which a subject or individual exhibits that particular desired emotion. Advantageously, enabling a user to select a desired emotion to capture in an image(s) provides more desirable or well-suited images for the user. In this way, as opposed to missing a candid moment in which a user expresses a particular emotion, embodiments described herein enable automatically capturing the candid moment having the desired emotion.

In operation, and at a high level, in accordance with a user selection of an emotion(s) and, in some cases, an extent of the emotion, a set of images (e.g., frames within a video stream) in which an individual expresses the selected emotion(s) can be captured and presented to the user. In embodiments, machine learning can be used to identify which images (e.g., frames within the video stream) include the selected emotion(s). In particular, images, such as frames of a video stream, can be analyzed using a trained model(s) to classify the emotion exhibited within the frame and generate a corresponding emotion score representing an extent of confidence in, or probability that, the emotion is expressed. An image or set of images corresponding with the selected emotion(s) and having a highest emotion score(s) can then be captured as an image (e.g., stored in association with the corresponding emotion) and/or presented to the user.

Figure 1B:
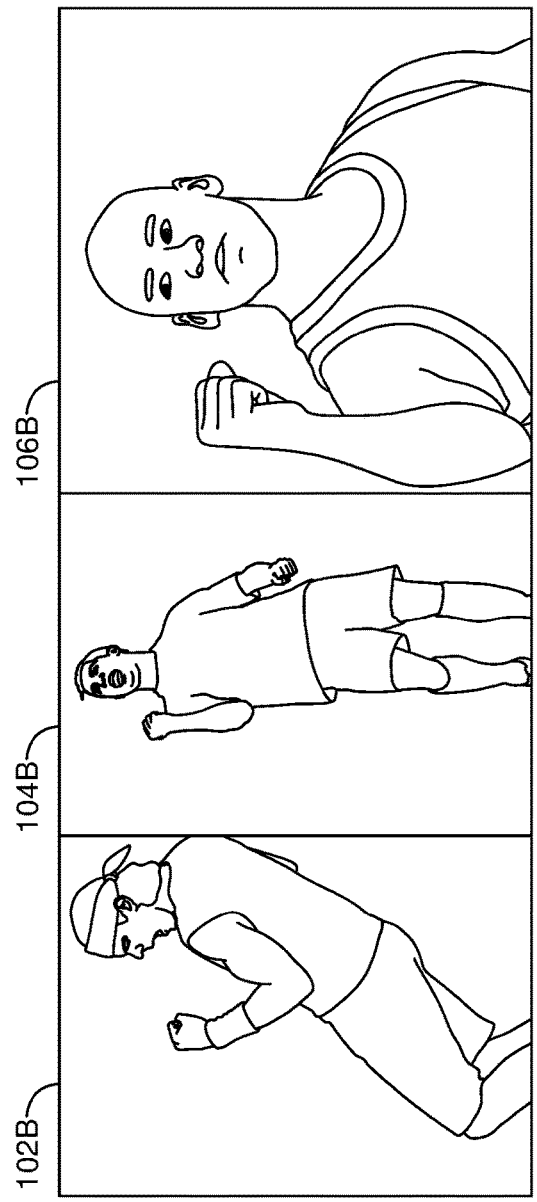
FIG. 1B depicts example images expressing emotion via facial and body expressions.

As can be appreciated, an emotion can be expressed via facial expressions (e.g., mouth, eye, or eyebrows positions) and/or body expressions (e.g., gestures, postures, etc.). Accordingly, in some cases, it is advantageous to analyze the body expression or language of a subject or individual to more accurately recognize an emotion. By way of example, and with brief reference to FIG. 1A-1B, assume three images 102A, 104A, and 106A are analyzed to detect emotion. In such cases, image 102A may be detected as exhibiting an anger expression, image 104A may be detected as exhibiting an excitement expression, and image 106A may be detected as exhibiting an anger expression. However, in analyzing the full images 102B, 104B, and 106B that present body language, different emotions may result. For instance, each of images 102B, 104B, and 106B may be detected as exhibiting an excitement expression.

As such, in accordance with embodiments described herein, classification of an image based on emotion of an individual(s) in the image can be determined utilizing analysis of facial expression and/or body expression. In this regard, a neural network system may be trained to classify images based on emotion in accordance with a facial expression and/or body expression exhibited in the image. In one implementation, a first model, or neural network, may be trained to analyze facial expressions, and a second model, or neural network, may be trained to analyze overall subject expressions, including both facial and body expressions.

In some cases, a two-layered model approach may be used to improve computation efficiency of classifying an image in relation to an emotion. For instance, the first trained model may be used to analyze facial expressions. In cases that an emotion score associated with an emotion exceeds a threshold, such an emotion score may be used for image classification, image filtering, and/or image selection. On the other hand, in cases that an emotion score associated with an emotion does not exceed a threshold, the second trained model may be used to analyze both facial and body expressions to generate an emotion score(s) used for image classification, image filtering, and/or image selection.

Figure 2:
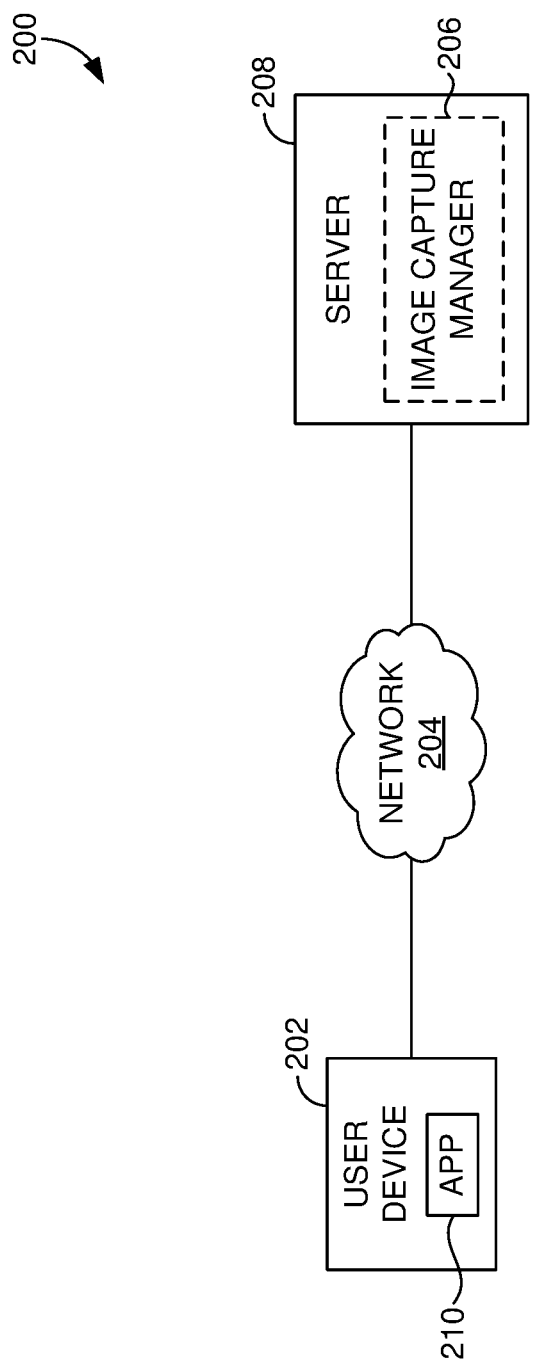
FIG. 2 depicts a diagram of an environment in which one or more embodiments of the present disclosure can be practiced, in accordance with various embodiments of the present disclosure.

Turning to FIG. 2, FIG. 2 depicts an example configuration of an operating environment in which some implementations of the present disclosure can be employed, in accordance with various embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 8.

It should be understood that operating environment 200 shown in FIG. 2 is an example of one suitable operating environment. Among other components not shown, operating environment 200 includes a user device 202, network 204, and server(s) 208. Each of the components shown in FIG. 2 may be implemented via any type of computing device, such as one or more of computing device 800 described in connection to FIG. 8, for example. These components may communicate with each other via network 204, which may be wired, wireless, or both. Network 204 can include multiple networks, or a network of networks, but is shown in simple form so as not to obscure aspects of the present disclosure. By way of example, network 204 can include one or more wide area networks (WANs), one or more local area networks (LANs), one or more public networks such as the Internet, and/or one or more private networks. Where network 204 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 204 is not described in significant detail.

It should be understood that any number of user devices, servers, and other components may be employed within operating environment 200 within the scope of the present disclosure. Each may comprise a single device or multiple devices cooperating in a distributed environment.

User device 202 can be any type of computing device capable of being operated by a user. For example, in some implementations, user device is the type of computing device described in relation to FIG. 8. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device can include one or more processors, and one or more computer-readable media. The computer-readable media may include computer-readable instructions executable by the one or more processors. The instructions may be embodied by one or more applications, such as application 210 shown in FIG. 2. Application 210 is referred to as a single application for simplicity, but its functionality can be embodied by one or more applications in practice. Although not illustrated, other user devices can include one or more applications similar to application 210.

The application 210 may generally be any application capable of facilitating the exchange of information between the user devices and the server 208 in carrying out automated image capture based on emotion detection. In some implementations, the application(s) comprises a web application, which can run in a web browser, and could be hosted at least partially on the server-side of environment 200. In addition, or instead, the application(s) can comprise a dedicated application, such as an application having image processing functionality. In some cases, the application is integrated into the operating system (e.g., as a service). It is therefore contemplated herein that "application" be interpreted broadly.

Figure 3B:
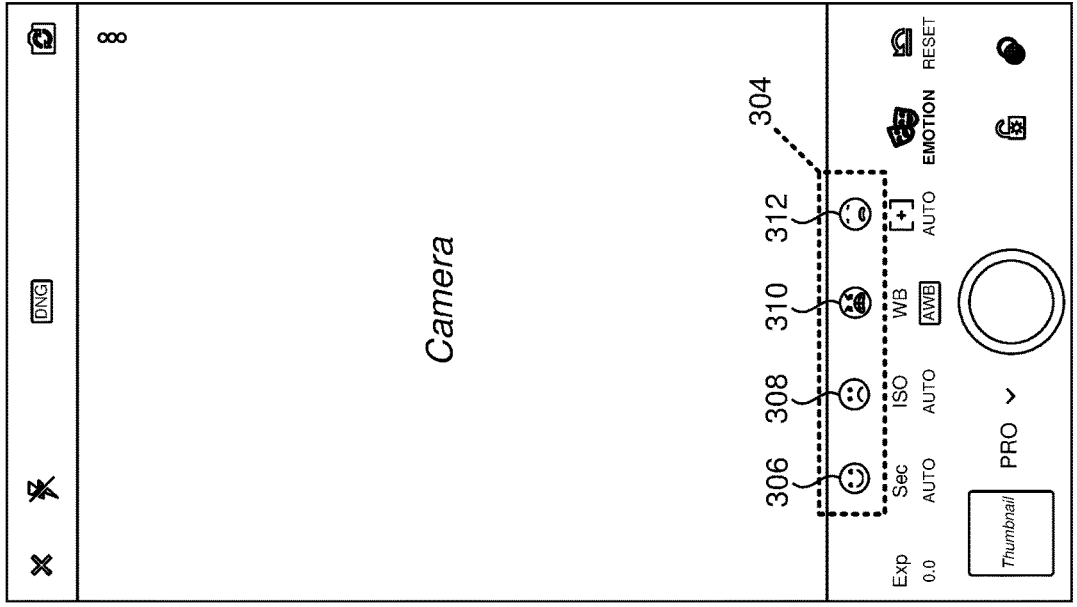
FIG. 3A-3D provide example graphical user interfaces in accordance with embodiments described herein.
Figure 3A:

In accordance with embodiments herein, the application 210 can facilitate automated image capture based on emotion detection. In some cases, automated image capture may be automatically implemented in association with the application 210 (e.g., as a default setting). In other cases, a user may select to initiate automated image capture. For example, with reference to FIG. 3A, FIG. 3A illustrates an emotion detection-based image capture control 302. Selection of control 302 can initiate automated image capture based on emotion detection.

In addition to initiating automated image capture based on emotion detection, the application 210 can facilitate selection of an emotion(s) for which to capture images. In particular, a user can select or input an emotion for which images are desired. In this regard, a user may interact with application 210, via a graphical user interface, to select one or more emotions of interest to the user. As described, such emotions can be any type of emotion, such as, for instance, excitement, happiness, sadness, fear, or the like. The emotions can be visually represented in any number of ways. For example, in some cases, emotions may be represented by icons, emoticons, images, text, or the like. By way of example, and with reference to FIGS. 3A-3D, assume a user selects the emotion detection-based image capture control 302 of FIG. 3A. In such a case, the application 210 can present a set of emotions 304 in FIG. 3B from which the user can select to capture corresponding images. As shown in FIG. 3B, a set of emotions may include a happy emotion icon 306, a sad emotion icon 308, an angry emotion icon 310, and a surprise emotion icon 312. Any number or type of emotions may be represented. In some cases, the set of emotions provided may be a set of default emotions. In other cases, a user may select the set of emotions to be provided as emotion options via the graphical user interface.

In some implementations, in association with selecting one or more emotions of interest, a user may select an emotion level indicating an extent, degree, or range of the emotion desire to be captured. An emotion level generally refers to an extent or degree desired to be exhibited by a subject or individual. By selecting an emotion level, images can be captured that not only correspond with the desired emotion, but also with the desired level of emotion. Emotion levels can be defined and represented in various ways. For example, in some cases, emotion levels may be represented by icons, emoticons, images, text, or the like.

Figure 3D:
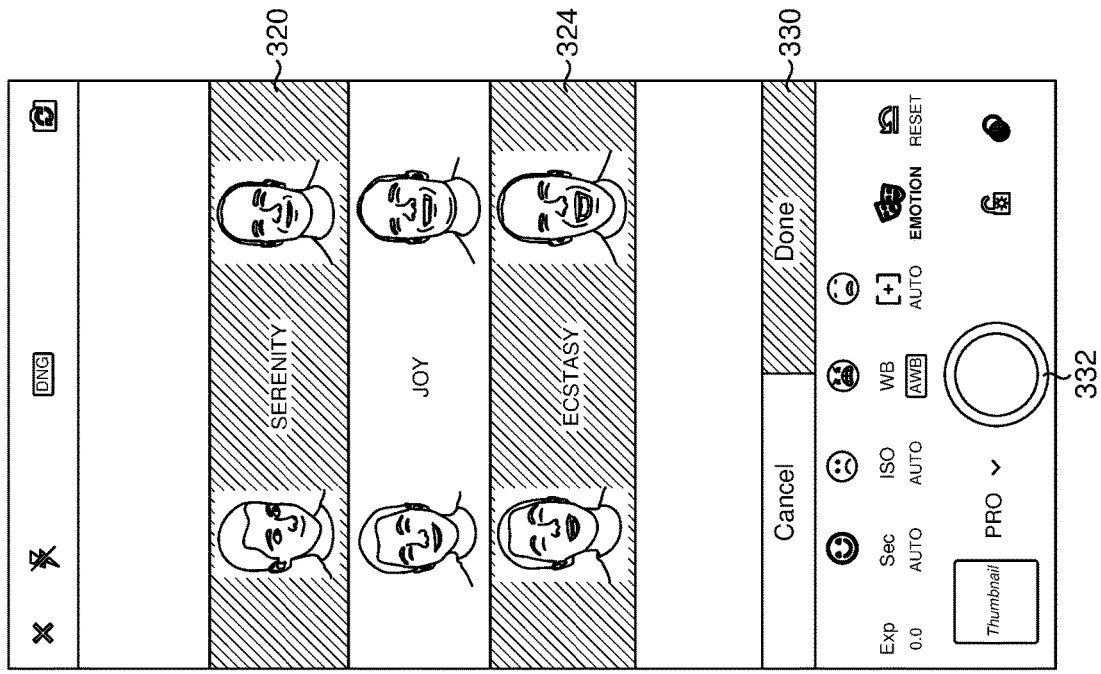
Figure 3C:
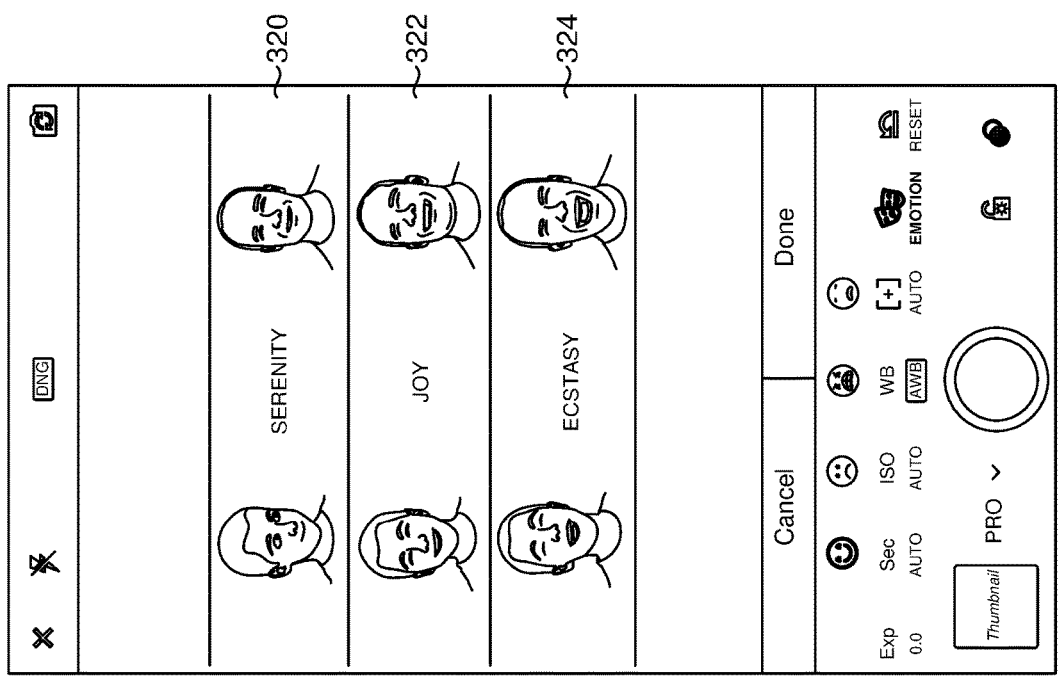

By way of example only, and with reference to FIGS. 3B and 3C, assume a user selects the "happy" emotion icon 306 of FIG. 3B. In such a case, the application 210 can present a set of emotion levels that indicate extents of expressing or exhibiting the emotion. In this regard, as shown in FIG. 3C, a serenity emotion level 320, a joy emotion level 322, and an ecstasy emotion level 324 can be presented to enable a user to select a level of emotion related to happiness. As can be appreciated, it is contemplated that any number of emotion levels can be selected by a user. In this way, a user may select all candidate emotion levels. In other cases, a user may select a single emotion level, or subset of candidate emotion levels.

Via the application 210, or another application operating on the user device 202, a user can initiate, select, or input a set of images (e.g., a video stream) for which automated image capture is desired. As one example, a user may initiate a video recording, via the graphical user interface, for which it is desired to obtain images based on emotion detection. In this way, a user may capture a set of images using a video camera on a device, for example, user device 102, for which automated image capture is desired. By way of example, and with reference to FIG. 3D, assume a user selects to capture "happy" expressions in images that correspond with a "serenity" emotion level 320 and an "ecstasy" emotion level 324. Upon completing selection of emotions and corresponding emotion levels for which images are desired, the user can select done 330 and, thereafter, select to initiate a video recording via record button 332, as shown in FIG. 3D. As another example for selecting images, a user may select a desired set of images (e.g., a video) from a repository, for example, stored in a data store accessible by a network or stored locally at the user device 202. Although generally described herein as the set of images being image frames within a video, as can be appreciated, other sets of images (e.g., still images) are contemplated within the scope of embodiments described herein. Further, although described as a user selecting or initiating a set of images, a set of images (e.g., video) may be automatically selected or initiated.

Based on the selected emotion(s), and in some cases the corresponding emotion level(s), one or more images can be identified from the set of images (e.g., video) as related to or corresponding with the selected emotion and/or emotion level. As will be described in more detail below, machine learning can be used to identify which images, for example within a video, have a subject that exhibits the desired emotion and/or emotion level. The image(s) identified as related to the desired emotion and/or emotion level can then be captured and/or provided for display to a user. In some cases, such images can be provided as recommendations, suggestions, or examples of images that correspond with a desired emotion and/or emotion level. Accordingly, the emotion images can be identified and provided to the user via the user device 202. In this regard, the emotion image(s) can be displayed via a display screen of the user device. Emotion images can be captured or presented in any manner. For example, such images may be provided as thumbnail representations or in full version. Further, in some implementations, the identified images may be labeled or designated based on the corresponding emotion. For example, assume a user selected to capture images associated with a happy emotion and an excited emotion. In such cases, the images identified as having a subject(s) expressing happiness can be labeled as such (e.g., categorized in a happy folder or file, tagged or captioned with a happy emotion, etc.), and the images identified as having a subject(s) expressing excitement can be labeled as such (e.g., categorized in an excitement folder or file, tagged or captioned with an excitement emotion, etc.).

As can be appreciated, in alternative embodiments, images associated with emotions may be captured without a user specifying any desired emotion. In this regard, images can be captured in association with one or more emotions (e.g., sadness, happiness, excitement). Such images and/or image data may be stored, for example, in association with the corresponding emotion (e.g., accessible via a file, link, etc.). Thereafter, when a user is interested in viewing an image expressing an emotion, the may navigate to such an image (e.g., select a link to view "happy" images).

With continued reference to FIG. 2, as described herein, server 208 can facilitate automated image capture based on emotion via image capture manager 206. Server 208 includes one or more processors, and one or more computer-readable media. The computer-readable media includes computer-readable instructions executable by the one or more processors. The instructions may optionally implement one or more components of image capture manager 206, described in additional detail below.

At a high-level, image capture manager 206 can take a set of images (e.g., video) as input, and based on an emotion and/or emotion level, identify an image(s) corresponding with the emotion and/or emotion level. In other words, the image capture manager 206 can analyze a set of images to identify which image(s) includes a subject or individual(s) that exhibits a desired emotion and/or emotion level.

In embodiments, to identify an image(s) including a particular emotion and/or emotion level, the image capture manager 206 can train and operate a model or neural network system in order to identify appropriate images from among a set of images (e.g., a video). Such a neural network system can be comprised of one or more neural networks trained to classify images in relation to an emotion class(s). For example, a neural network system can include neural networks that classify a set of input images in accordance with an emotion class. As used herein, an emotion class may refer to a class indicating a type of emotion and/or an emotion level. For example, an emotion class may be happiness to indicate an emotion of happiness. As another example, an emotion class may be serenity to indicate an emotion of happiness and an emotion level of serenity.

To train an emotion classification model, or neural network, the neural network can take as input a set of input training images. An input training image generally refers to a training image provided to the neural network system, or portion thereof. The emotion classification model can generate emotion scores for each of a set of candidate emotions and/or candidate emotion levels. That is, the emotion classification model can generate emotion scores for a set of emotion classes. As described, the emotion scores indicate a level or extent of confidence or probability of the classification. Using the emotion scores, the emotion prediction model can then classify the image in accordance with an emotion and/or emotion level (emotion class). As such, output from the neural network can include a classification indicating an emotion and/or emotion level corresponding with an image and a corresponding emotion score(s) indicating an extent of confidence or probability of the classification of the emotion and/or emotion level.

An emotion classification identified in accordance with training a neural network can be compared to a reference emotion to facilitate training of the neural network. In this regard, the neural network can be modified or adjusted based on the comparison such that the quality of subsequently identified emotions increases. As used herein, a reference emotion refers to an emotion and/or emotion level classification that is used as a standard, or ground-truth, for evaluating the quality of an emotion or emotion level identified in association with a training input image by the neural network.

In various implementations, a neural network system of image capture manager 206 is iteratively trained using multiple training input images to identify emotion and/or emotion level classifications. In each iteration, image capture manager 206 can select an input image and associated reference information. Reference information can include a reference emotion, for example, indicated as an emotion for the corresponding input image. The emotion and/or emotion level classification can then be compared to the reference emotion and/or emotion level classification to compute any errors. Such errors can then be fed back through the neural network to teach the network to reduce such errors in future iterations.

For cloud-based implementations, the instructions on server 208 may implement one or more components of image capture manager 206, and application 210 may be utilized by a user to interface with the functionality implemented on server(s) 208. In some cases, application 210 comprises a web browser. In other cases, server 208 may not be required. For example, the components of image capture manager 206 may be implemented completely on a user device, such as user device 202. In this case, image capture manager 206 may be embodied at least partially by the instructions corresponding to application 210.

Thus, it should be appreciated that image capture manager 206 may be provided via multiple devices arranged in a distributed environment that collectively provide the functionality described herein. Additionally, other components not shown may also be included within the distributed environment. In addition, or instead, image capture manager 206 can be integrated, at least partially, into a user device, such as user device 202. Furthermore, image capture manager 206 may at least partially be embodied as a cloud computing service.

Figure 4:
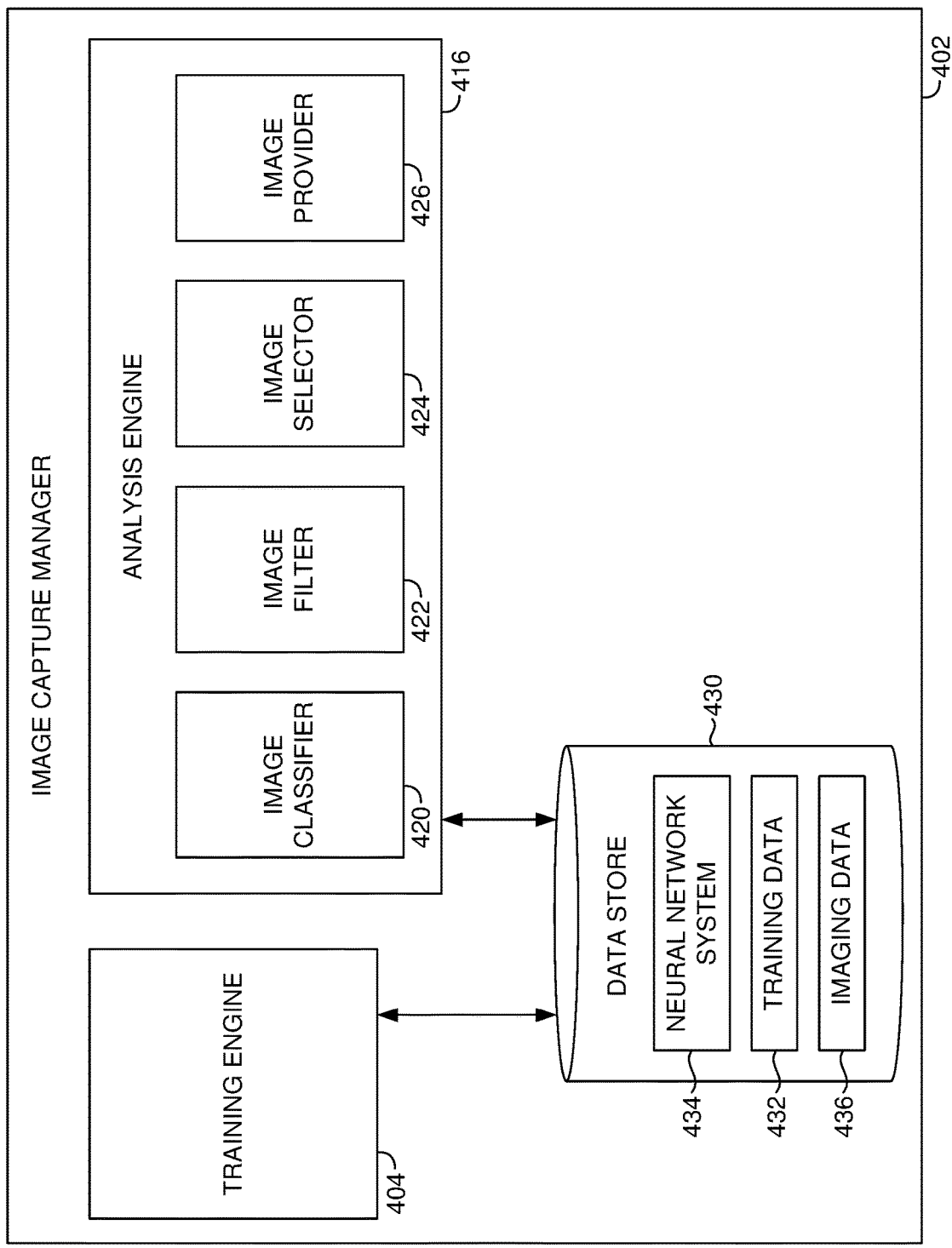
FIG. 4 depicts an example configuration of an operating environment in which some implementations of the present disclosure can be employed, in accordance with various embodiments of the present disclosure.

Referring to FIG. 4, aspects of an illustrative image capturing system are shown, in accordance with various embodiments of the present disclosure. Image capture manager 402 includes training engine 404, analysis engine 416, and data store 430. The foregoing components of image capture manager 402 can be implemented, for example, in operating environment 200 of FIG. 2. In particular, those components may be integrated into any suitable combination of user device 202 and server 208.

Data store 430 can store computer instructions (e.g., software program instructions, routines, or services), data, and/or models used in embodiments described herein. In some implementations, data store 430 stores information or data received via the various components of image capture manager 402 and provides the various components with access to that information or data, as needed. Although depicted as a single component, data store 430 may be embodied as one or more data stores. Further, the information in data store 430 may be distributed in any suitable manner across one or more data stores for storage (which may be hosted externally).

In embodiments, data stored in data store 430 includes training data 432. Training data generally refers to data used to train a neural network, or portion thereof. As such, training data 432 can include training images, reference information, or the like. Data store 430 can also be used to store neural network system 434. Such a neural network system can be comprised of one or more neural networks, for example, associated with various emotions and/or emotion levels. In embodiments, a model, or neural network, is trained to classify the emotion(s) and/or emotion level(s) associated with one or more individuals in an image. A neural network may be in any number of forms, such as for example, a fully connected network, a convolutional network, a residual network, a recurrent network, or the like. For instance, one implementation may use a convolutional neural network with various layers of neurons.

Data store 430 can also store imaging data 436. Imaging data generally refers to date related to capturing images in relation to emotion. Such imaging data may include, input images, such as still images or video frames, classifications of emotion and/or emotion levels, captured images having a particular emotion/emotion level, emotion scores, or the like.

Training engine 404 can be used to train neural network system 434. Such a neural network system can be used to identify emotion and/or emotion level (an emotion class) corresponding with an individual(s) in an image. The training engine 404 can obtain images as input to utilize to train one or more models, or neural networks. A model may be any type of model generated or trained to classify images as expressing a particular emotion and/or emotion level. Although training a model is generally described herein as training a neural network, other implementations may be used in accordance with embodiments described herein.

As will be described in more detail below, the training engine 404 can be configured to train multiple models or neural networks of the neural network system. In one embodiment, the training engine 404 trains a facial model and a body model. A facial model refers to a model, or neural network, that analyzes a facial expression to classify emotion and/or emotion level corresponding with an image. A body model refers to a model, or neural network, that analyzes a body expression to classify emotion and/or emotion level corresponding with an image. In some implementations, analyzing body expression includes analyzing a facial expression in addition to body expression to classify emotion and/or emotion level corresponding with an image.

Input images for training a model, such as a neural network, can be any type of image. For example, input images may be still images. As another example, input images can include frames from a video. As a model is trained to classify images as having a particular emotion and/or emotion level, images associated with the particular emotions/emotion levels exhibited by an individual(s) may be used as input training images.

Images to input for training a model(s) may be obtained from any number of sources, such as an image repository, user devices, servers, for example. As one example, FER-2013 Faces Database, which includes an extensive number of images displaying varying emotions, may be used to train models, for example, a facial model. In some cases, to train a facial model, images may be cropped to generate training images that focus on the face within an image. As another example, portrait images from "Open Images" dataset released by GOOGLE may be used to train models, for example, a body model.

Generally, the greater amount of training data available, the more accurate a neural network can become. Accordingly, in some embodiments, the training engine 404 can perform data augmentation. Data augmentation includes modifying existing images to exhibit different emotions to use as training images. Data augmentation techniques may include altering a smile, modifying eye or eyebrow position, cropping, mirroring, or the like. As one example, a number of training images may be scaled by randomly cropping and mirroring images. As another example, images may be altered by modifying a mouth region of an individual. Data augmentation may help to reduce overfitting and increase accuracy by providing additional training images.

As discussed herein, in some embodiments, multiple models or neural networks are trained and utilized. In this regard, a facial model may be trained to predict emotion based on facial expressions, and a body model may be trained to predict emotion based on both facial expressions and body expression (the remainder of the body captured in the image). As can be appreciated, training for the various models may include usage of the same training images or of different training images. For example, training a facial model may include utilization of input images that focus on the face, while training a body model may include utilization of input images that include the body. Advantageously, in cases in which separate models are trained and utilized, in implementation, less training data may be needed or used for training the body model to achieve high emotion prediction accuracy.

The training engine 404 can train the model(s), or neural network(s) in any number of ways. Generally, the model(s) can analyze the input training images and output an emotion and/or emotion level classification corresponding with the input training image. In embodiments, an emotion score indicating a confidence or probability can be generated in association with each emotion class (e.g., emotion and/or emotion level). Based on the emotion scores, the input training image can be classified. As such, the model can output an emotion/emotion level classification and corresponding emotion score.

As described, the training engine 404 may train a neural network or set of neural networks to classify emotion/emotion level corresponding with an input image. In some embodiments, a neural network (e.g., an emotion classifying neural network) may contain an input layer of M×M (size of input images down sampled). This layer can be followed by a convolution layer, a local contrast normalization layer, and a max pooling layer. Thereafter, two more convolutional layers and one or more fully connected layer, connected to a softmax output layer, may be utilized. The output layer may be a softmax output layer to produce a probability to be output from 0 to 1. Each layer can contain ReLu activation units. As can be appreciated, this is one example set of layers in a neural network, but other neural network structures can be implemented in accordance with embodiments described herein.

Upon identifying an emotion and/or emotion level (emotion class) via a neural network, the emotion/emotion level can be compared to a reference emotion/emotion level to facilitate training of the neural network. In this regard, the neural network can be modified or adjusted based on the comparison such that the quality of subsequently identified emotion classes increases. As described, a reference emotion/emotion level refers to an indication of an emotion that is used as a standard, or ground-truth, for evaluating the quality of an emotion/emotion level identified in association with a training input image by the neural network.

A reference emotion/emotion level may be input or selected in any number of ways. The training engine 404 can access the reference emotion/emotion level (e.g., within training data 432) associated with the input training image. The emotion/emotion level can then be compared to the reference emotion/emotion level to compute any errors. Errors can be determined, for example, using loss functions, such as reconstruction loss, or the like. Errors determined using loss functions are used to minimize loss in the neural network by backwards propagation of such errors through the network. In this regard, such errors can then be fed back through the neural network to teach the network to reduce such errors in future iterations.

As can be appreciated, such a training process may be performed to train both a facial model and a body model. The trained models or neural networks, such as a facial model and a body model, can be stored, for example, in data store 430. The trained neural networks can then be used by the analysis engine 416 to automatically capture images in which a particular emotion(s) and/or emotion level(s) is expressed.

Image analysis engine 416 is generally configured to analyze and capture images having particular emotion(s) and/or emotion level(s). In this regard, the analysis engine 416 can access and utilize trained neural networks in neural network system 434 to identify and capture images with a particular emotion(s)/emotion level(s). The analysis engine 416 may include an image classifier 420, an image filter 422, an image selector 424, and an image provider 426.

The image classifier 420 can obtain a set of image(s) as input for which to classify as having a particular emotion class, such as an emotion(s) and/or emotion level(s). As described, a set of images for which capturing of a particular emotion(s) are desired can be any type of images. In some cases, the input images may be still images. In other cases, the input images may be image frames of a video.

A set of images may be obtained from any source. For example, a set of images can be still images obtained from a user device or accessed from another repository or data storage. As another example, a user device capturing a video may provide the image frames within the video. Alternatively, a video may be stored and obtained from a user device or accessed from another repository or data storage. As can be appreciated, in the case the images are image frames from a video, the images can be provided to the image classifying component 420 in a streaming manner such that images exhibiting an emotion can be captured in a dynamic, or real time, manner. In a case of a video, a queue of N frames (e.g., N=10) may be maintained to perform processing in the background as images are captured.

In some cases, the images obtained or classified may be only images having an individual's face included in the image. As emotion associated with a subject(s) in an image is desired, those images without any individual's face may be excluded from analysis. Advantageously, removing or foregoing analysis of images without a face can facilitate acceleration of core processing. Face detection can be performed in any number of ways to filter out or remove images without faces.

In addition or in the alternative to reducing the number of images analyzed based on face detection, image similarity may be taken into consideration to reduce the number of images analyzed. In particular, as performing classification for each image may be too heavy, images may be skipped or removed based on similarity. That is, if a first image is being processed and a second image is similar to the first image (e.g., a facial expression is similar), the second image may not be analyzed for emotion classification. Skipping images (e.g., frames) based on how much change or variation occurs between images (e.g., in face expression) can decrease computation.

To classify input images in accordance with an emotion type and/or emotion level, the image classifying component 420 can utilize the trained or generated model(s). In this way, an input image can be classified in association with an emotion and/or emotion level based on facial expression and/or body expression exhibited in the image by one or more individuals. To this end, facial expression and/or body expression may be analyzed in an input image and used to classify the input image as exhibiting a particular emotion and/or emotion level (emotion class). As previously described, utilizing both facial expressions and body expressions can provide a more accurate prediction of an emotion exhibited in an image.

Generally, and at a high level, a trained neural network can take as input an image and identify or generate various emotion scores associated with a set of emotions (e.g., each emotion class). Based on the emotion scores, the image can be classified as corresponding with a particular emotion and/or emotion level. In some cases, a single facial model, or neural network, that analyzes facial expression may be utilized. In other cases, a single body model, or neural network, that analyzes both facial and body expressions may be utilized.

In yet other cases, multiple emotion classification models, or neural networks, may be used to classify an image (e.g., video frame) into an emotion class(s). In one embodiment, a two-model layered approach may be used for classifying emotion and/or emotion level. Using a two-model layered approach, as described herein, may more efficiently perform classification and achieve higher accuracy. In particular, images can initially be run through the facial model, which may be a more light-weight model. In instances in which an emotion classification is identified with a strong probability (e.g., exceeding a confidence threshold), such an emotion classification can be utilized for the image without using the body model. On the other hand, in instances in which an emotion classification is not identified with a strong probability (e.g., falls below a confidence threshold), the image can be input into the body model to obtain a classification and corresponding probability. Such a two-model layered approach may be advantageously utilized when analyzing images in a live or real time implementation. In offline processing, both models may be run and scores combined (or select one score) to sort the images at the end.

By way of example only, assume a face model outputs emotion class scores in the range of 0 to 1, with 1 indicating a high probability that an expression is a particular emotion and/or emotion level. Further assume that an emotion score 0.6 or greater indicates a high probability the classification is successful. Now assume an input image is run through a facial model, which outputs a classification of a "happy" emotion with an emotion score of 0.7. In such a case, the input image can be classified as "happy" with an emotion score of 0.7 and no further analysis is performed. By comparison, assume an input image is run through a facial model, which outputs a classification of a "happy" emotion with an emotion score of 0.5. In this case, the input image can be run through a body model to classify the image and provide a corresponding emotion score.

In cases that multiple models, such as two models, are utilized to classify an image and generate a corresponding emotion score, a single classification and emotion score from one of the models may be selected and utilized. For example, a classification and emotion score output from the body model may be utilized. Alternatively, a combined emotion score may be generated from the multiple emotion scores. In this regard, the multiple emotion scores may be averaged, weighted averaged, or the like. By way of example only, in cases that both a facial model and a body model are utilized, combined emotion scores are generated and used to classify an image in relation to emotion. In this way, the combined emotion scores can be used to identify a final classification. In some implementations, a combined emotion score can be generated by averaging the emotion scores for each emotion class. In this regard, a first combined score for a first emotion class may be determined, a second combined score for a second emotion class may be determined, and so on. Based on the combined emotion scores, the image can be classified in association with an emotion and/or emotion level. One calculation for computing a combined emotion score for an emotion may be:

$$(FE(s)+BE(s))/2 \qquad \text{(equation 1)}$$

wherein FE represents the emotion score generated by the facial model, and BE represents the emotion score generated by the body model.

The image filter 422 is generally configured to filter classified images to correspond with a selected emotion and/or emotion level. As previously described, a user may select one or more emotions and/or one or more emotion levels for which images are desired to be captured. In cases that images can be classified in accordance with any of a number of candidate emotions, images classifications that do not match the selected emotion and/or emotion level can be filtered out of the set of images. Stated differently, only those images classified with the selected emotion and/or emotion level may be maintained.

In operation, image classifications that do not match with the user-selected emotion and/or emotion level, and/or emotion scores less than a threshold value for a user-selected emotion(s), can be removed from the cache. As one example, for each emotion class vector, images can be queued, but those images whose emotion class score is less than the threshold for user requested emotion classes (LE) are not cached. As can be appreciated, in cases in which a user selected emotion and/or emotion level does not occur (e.g., images are captured for each of a set of emotion classes), the image filter 422 may not be needed, or may operate to filter images having an emotion class score less than a threshold.

An image selector 424 is generally configured to select or refine the set of captured images. In this regard, the image selector 424 selects or refines the set of images to capture or maintain from the classified images, and in particular, the filtered images. Generally, the image selector 424 can select a number of images to capture in association with a selected emotion and/or emotion level, for example to store and/or present to a user. In some cases, a set of classified images associated with an emotion (e.g., entire set) can be analyzed to select a set of images to capture. For example, images corresponding with an emotion score above a threshold may be selected to capture. As another example, a defined number of images corresponding with the highest emotion scores may be selected to capture. Such a defined number may be system defined or user selected, for instance. Such an implementation may be employed in systems in which images are analyzed in an offline manner.

In other cases, a set of classified images associated with an emotion can be selected or refined in a continuous manner to select a set of images to capture. As can be appreciated, refining in an ongoing manner can be particularly advantageous in cases that the incoming input images are images from a streaming video. For example, as images are input and analyzed in a real time, or dynamic, manner, the image selector 424 can perform continuous refinement to select the best or preferred images to capture for the selected emotion and/or emotion level. In some cases, images corresponding with an emotion score above a threshold may be selected to capture. As another example, a defined number of images corresponding with the highest emotion scores may be selected to capture. A defined number may be system defined or user selected. To select or refine images in an ongoing or continuous manner, a map of an emotion and/or emotion level and corresponding image data (e.g., frame data) can be maintained. When a new image (e.g., frame) is obtained with a higher emotion score for the particular emotion class, a vector of such images can be maintained for each emotion class. As one example, image data associated with three images may be maintained in a vector. As a new image for a particular class is detected having a greater or higher emotion score than those maintained in the vector, the image data associated with the new image can be added to the vector, while image data associated with the image having the lowest emotion score is removed from the vector. In this way, the images maintained for a particular emotion class can be continuously refined.

The image provider 426 is configured to provide the selected set of images. In this regard, the image provider 426 may provide the selected set of images for each user-selected emotion class. Alternatively, the image provider 426 may provide the selected set of images for each emotion class. In some cases, the selected set of images may be automatically provided upon analysis of an entire set of input images (e.g., a video). In other cases, the selected set of images may be provided based on a user indication. By way of example only, when a user stops a video, images selected to correspond with each user-selected emotion class can be provided to a user device for presentation to a user via a graphical user interface.

Generally, the image(s) identified as related to the desired emotion and/or emotion level are captured and/or provided for display to a user, via the image provider 426. The images, and/or corresponding image data, may be stored, for example, as imaging data 436 in data store 430. In some cases, such images can be provided as recommendations, suggestions, or examples of images that correspond with a desired emotion and/or emotion level. Accordingly, the emotion images can be identified and provided to the user via the user device 202. In this regard, the emotion image(s) can be displayed via a display screen of the user device. Emotion images can be captured or presented in any manner. For example, such images may be provided as thumbnail representations or in full version. Further, in some implementations, the identified images may be labeled or designated based on the corresponding emotion. For example, assume a user selected to capture images associated with a happy emotion and an excited emotion. In such cases, the images identified as having a subject(s) expressing happiness can be labeled as such (e.g., categorized in a happy folder or file, tagged or captioned with a happy emotion, etc.), and the images identified as having a subject(s) expressing excitement can be labeled as such (e.g., categorized in an excitement folder or file, tagged or captioned with an excitement emotion, etc.).

With reference to FIG. 5, a process flow is provided showing an embodiment of method 500 for automatically capturing images based on emotion detection. Method 500 can be performed, for example, by analysis engine 416, as illustrated in FIG. 4.

At block 502, a selection of an emotion class from among a set of emotion classes can be received. As described, an emotion class indicates an emotion exhibited by a subject desired to be captured in an image. An emotion class can be a type of emotion and/or a level of emotion. As such, a selection of a type of emotion(s) and a level of emotion(s) may be received. At block 504, a set of images for which to identify an image(s) exhibiting the emotion associated with the selected emotion class is obtained. The set of images may correspond with a video or set of still images. In cases that the set of images are frames from a video, the set of images can be obtained in an ongoing basis when the video is being streamed.

At block 506, the set of images are analyzed to identify an image(s) in which a subject exhibits the emotion associated with the selected emotion class. Generally, a neural network system can be used to classify the images into emotion classes based on analysis of the facial and/or body expressions exhibited in the images. The classifications can then be used to identify the image corresponding with the selected emotion class. At block 508, the image can be provided in association with the selected emotion class. In some cases, the image can be stored in association with the selected emotion class. Alternatively or additionally, the image can be presented in association with the selected emotion class, such that a user selecting the emotion class can view images associated with therewith.

Turning to FIG. 6, FIG. 6 illustrates another process flow showing a method 600 for automatically capturing images based on emotion detection. Method 600 can be performed, for example, by analysis engine 416, as illustrated in FIG. 4. Initially, at block 602, a set of images, such as frames of a video, for which to identify an image(s) exhibiting a particular emotion class, is obtained. As described, the set of images can be obtained in an ongoing manner, such as frames are captures within a video. At block 604, each image of the set of images are classified into an emotion class based on the emotion exhibited in the corresponding image using at least one neural network. The neural network can classify images based on facial expression and/or body expression exhibited by one or more subjects in the corresponding image. At block 606, an emotion score is identified in association with each of the classified images. Thereafter, at block 608, a set of one or more images classified into the particular emotion class are selected for presentation, for example, to a user. In embodiments, the emotion scores can be used to select the images to present. For instance, images having emotion scores exceeding a threshold or a predefined number of images with highest emotion scores may be selected.

Figure 7:
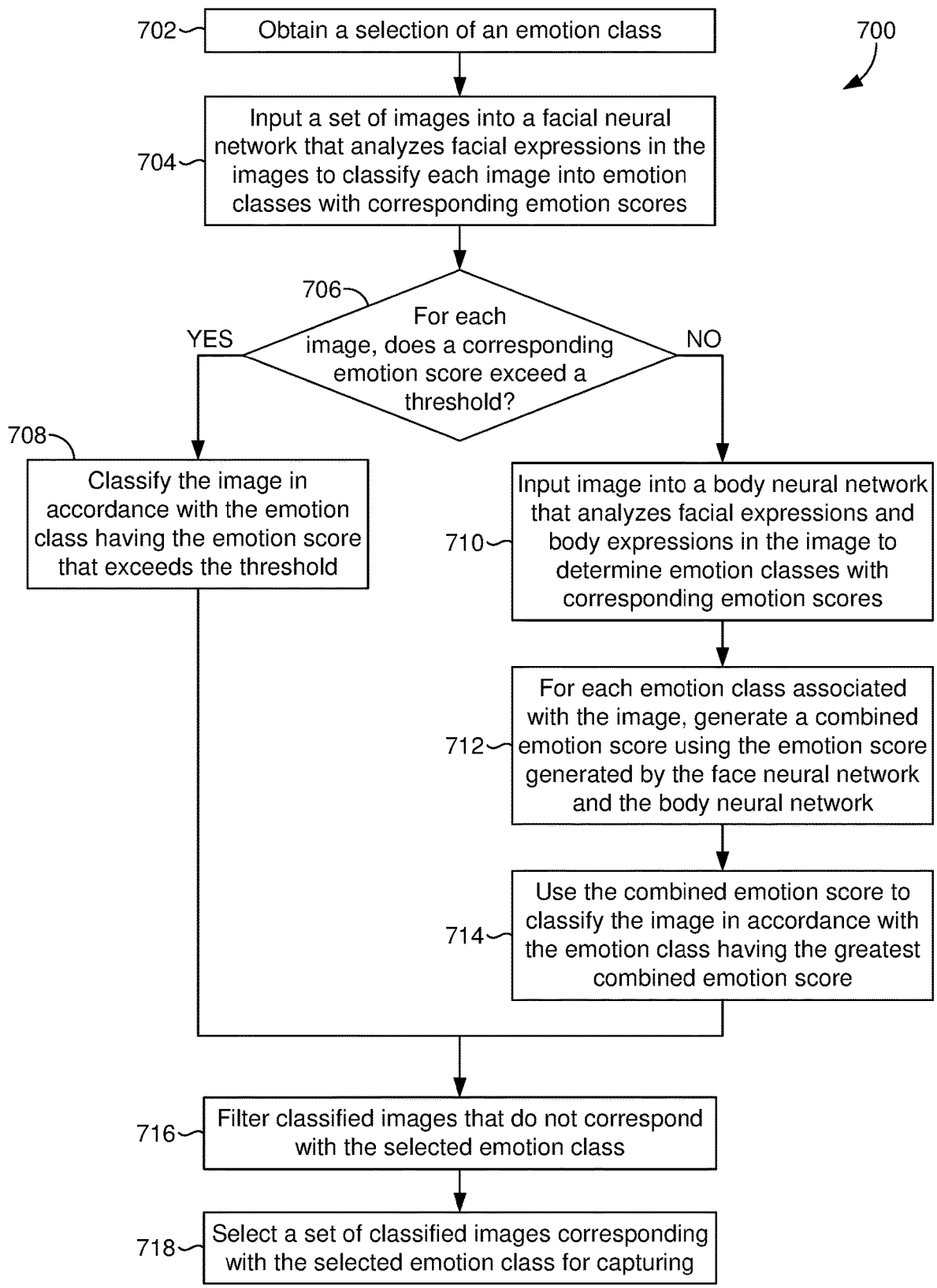
FIG. 7 illustrates another example method for automated image capturing based on emotion detection, in accordance with embodiments of the present invention.

With respect to FIG. 7, FIG. 7 illustrates another process flow showing a method 700 for automatically capturing images based on emotion detection. Method 700 can be performed, for example, by analysis engine 416, as illustrated in FIG. 4. Initially, at block 702, a selection of an emotion class is obtained. As described, such a selection can be indicated by a user via a graphical user interface. Further, a user may select any of a number of emotions and/or emotion levels. At block 704, a set of images, or data associated therewith, is input into a facial neural network that analyzes facial expressions in the images to classify each image into emotion classes with corresponding emotion scores. The emotion scores indicate the probability or confidence of the classification. At block 706, for each image, it is determined whether a corresponding emotion score exceeds a threshold. In cases that a corresponding emotion score exceeds a threshold, at block 708, the image is classified in accordance with the emotion class having the emotion score that exceeds the threshold. On the other hand, in cases that a corresponding emotion score does not exceed a threshold, at block 710, the image, or data associated therewith, is input into a body neural network that analyzes facial expressions and body expressions in the image to determine emotion classes with corresponding emotion scores. At block 712, for each emotion class associated with the image, a combined emotion score is generated using the emotion score generated by the face neural network and the body neural network. At block 714, the combined emotion score is used to classify the image in accordance with the emotion class having the greatest combined emotion score. At block 716, classified images that do not correspond with the selected emotion class are filtered. In some cases, classified images having an emotion score or combined emotion score that do not exceed a threshold can additionally or alternatively be filtered. At block 718, a set of classified images corresponding with the selected emotion class are selected for capturing, such as storing and/or presenting to a user.

Figure 8:
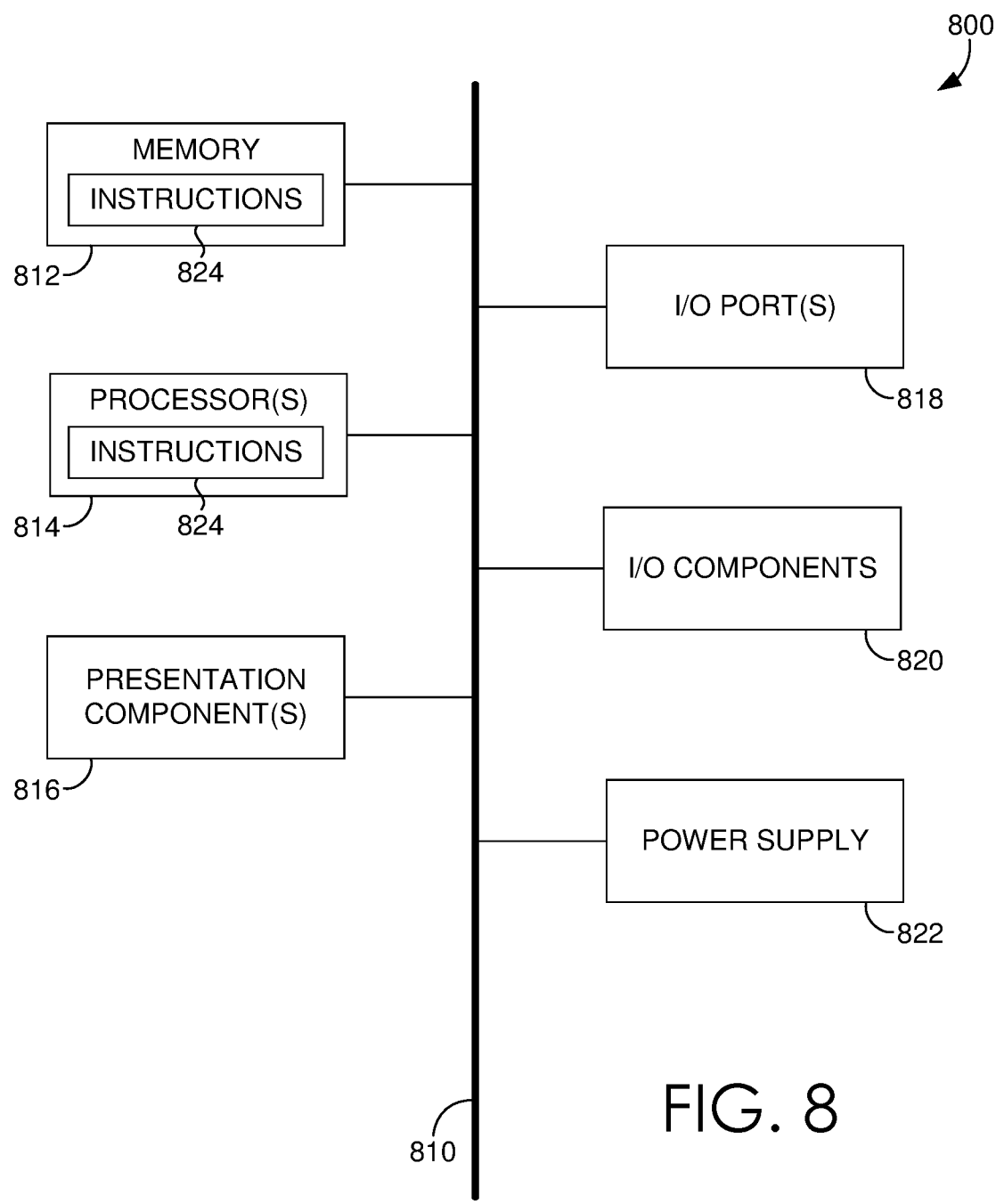
FIG. 8 is a block diagram of an example computing device in which embodiments of the present disclosure may be employed.

Having described embodiments of the present invention, FIG. 8 provides an example of a computing device in which embodiments of the present invention may be employed. Computing device 800 includes bus 810 that directly or indirectly couples the following devices: memory 812, one or more processors 514, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 8 is merely illustrative of an exemplary computing device that can be used in connection with one or more embodiments of the present invention. Distinction is not made between such categories as "workstation," "server," "laptop," "handheld device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 812 includes computer storage media in the form of volatile and/or nonvolatile memory. As depicted, memory 812 includes instructions 824. Instructions 824, when executed by processor(s) 814 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 800. Computing device 800 may be equipped with depth cameras, such as stereoscopic camera systems, infrared camera systems, RGB camera systems, and combinations of these, for gesture detection and recognition. Additionally, computing device 800 may be equipped with accelerometers or gyroscopes that enable detection of motion. The output of the accelerometers or gyroscopes may be provided to the display of computing device 800 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method for automated image capture based on emotion detection, the method comprising: receiving a selection of an emotion class from among a set of emotion classes presented via a graphical user interface, the emotion class indicating an emotion desired to be captured in an image; analyzing a set of images corresponding with a video to identify at least one image in which a subject exhibits the emotion associated with the selected emotion class, wherein the set of images are analyzed using at least one neural network that classifies images in association with emotion exhibited in the images, the at least one neural network comprising a first neural network that classifies images based on facial expression and a second neural network that classifies images based on facial expression and body expression, wherein the first neural network is used to identify a first emotion class and corresponding first emotion score for each image and the second neural network is used to identify a second emotion class and corresponding second emotion score for the particular image; and providing the at least one image in association with the selected emotion class.

2. The computer-implemented method of claim 1, wherein the emotion class comprises a type of emotion.

3. The computer-implemented method of claim 1, wherein the emotion class comprises a type of emotion, an emotion level that indicates an extent of a particular type of emotion, or a combination thereof.

4. The computer-implemented method of claim 1, wherein the emotion class is selected by a user via the graphical user interface.

5. The computer-implemented method of claim 1, wherein the set of images are analyzed in real time as the video is streamed.

6. The computer-implemented method of claim 1, wherein the at least one image is presented in association with the selected emotion class.

7. The computer-implemented method of claim 1, wherein the at least one image in which the subject exhibits the emotion is identified using the first and second emotion classes and corresponding first and second emotion scores.

8. One or more non-transitory computer-readable media having a plurality of executable instructions embodied thereon, which, when executed by one or more processors, cause the one or more processors to perform a method for automated image capture based on emotion detection, the method comprising: obtaining a set of images for which to identify at least one image in which a subject exhibits a particular emotion class; classifying each image of the set of images into an emotion class based on the emotion exhibited in the corresponding image using at least one neural network, the at least one neural network comprising a first neural network that classifies images based on facial expression and a second neural network that classifies images based on facial expression and body expression, wherein the first neural network is used to identify a first emotion class and corresponding first emotion score for each image, and when a first emotion score falls below a threshold for a particular image, the second neural network is used to identify a second emotion class and corresponding second emotion score for the particular image; and selecting one or more images classified into the particular emotion class for presentation, wherein the one or more images classified into the particular emotion class are selected based on emotion scores output by the at least one neural network in accordance with the classification.

9. The media of claim 8, wherein the particular emotion class is selected via a graphical user interface from among a set of emotion classes.

10. The media of claim 9, wherein the particular emotion class comprises a type of emotion, an emotion level that indicates an extent of a particular type of emotion, or a combination thereof.

11. The media of claim 8, wherein when the first neural network and second neural network are used to generate the first emotion score and the second emotion score, generating a combined emotion score using the first emotion score and the second emotion score, the combined emotion score being used in selecting the one or more images classified into the particular emotion class for presentation.

12. A computing system comprising: one or more processors; and one or more non-transitory computer-readable storage media, coupled with the one or more processors, having instructions stored thereon, which, when executed by the one or more processors, cause the computing system to provide: means for training a neural network system, wherein the neural network system includes: a first neural network that classifies images as exhibiting an emotion based on facial expression and body expression, and a second neural network that classifies images as exhibiting an emotion based only on facial expressions; and means for using the neural network system to identify an image within a set of images in which a subject exhibits a particular emotion class by:

inputting the image into the second neural network to obtain a first emotion class and a corresponding first emotion score, inputting the image into the second neural network to obtain a second emotion class and a corresponding second emotion score, and generating a combined emotion score using the first emotion score and the second emotion score, the combined emotion score being used to identify the image as exhibiting the particular emotion class.

13. The system of claim 12, wherein using the neural network system to identify an image within a set of images in which a subject exhibits a particular emotion class by: determining that the first emotion score falls below a threshold value, wherein inputting the image into the second neural network is based on the first emotion score falling below the threshold value.

14. The system of claim 12 further comprising means for causing presentation of the image in association with the particular emotion class.

* * * * *